United States Patent [19]

Russell

[11] 4,290,411

[45] Sep. 22, 1981

[54] SOLAR ENERGY COLLECTOR SUN-TRACKING APPARATUS AND METHOD

[76] Inventor: George F. Russell, 8513-42nd Ave. West, Tacoma, Wash. 98466

[21] Appl. No.: 912,456

[22] Filed: Jun. 5, 1978

[51] Int. Cl.$^3$ .............................................. F24J 3/02
[52] U.S. Cl. ................................. 126/425; 250/203 R
[58] Field of Search ...................... 126/425; 250/203 R

[56] References Cited

U.S. PATENT DOCUMENTS

| | | | |
|---|---|---|---|
| 3,305,686 | 2/1967 | Carter et al. | 126/425 |
| 4,068,653 | 1/1978 | Bourdon et al. | 176/425 |
| 4,090,498 | 5/1978 | Benson | 126/442 |
| 4,153,038 | 5/1979 | McDonald | 126/425 |

OTHER PUBLICATIONS p. 527, vol. 12, pp. 52-53, vol. 13, and pp. 737-738, vol. 1, All of McGraw-Hill Encyclopedia of Science and Technology.

Primary Examiner—Carroll B. Dority, Jr.
Attorney, Agent, or Firm—Robert W. Beach; Ward Brown; Douglas E. Winters

[57] ABSTRACT

A solar energy collector is mounted for adjustable azimuth rotation about a vertical axis and adjustable elevation tilting about a horizontal axis for pointing toward the sun. The collector is driven for rotation about the vertical axis and for tilting about the horizontal axis by drive mechanism controlled by the angle of incidence of the sun's rays to the collector when the insolation is above a predetermined intensity. When the insolation is below such predetermined value, the drive mechanism is controlled by a stored computerized program. Control responsive to the sun's rays is effected by at least one light sensitive photoelectric cell. Preferably one pair of cells is arranged in a horiziontal axis and another pair is arranged in a plane perpendiuclar to such horizontal axis. The photoelectric cells are buried in shield tubes to shield the cells from stray light. However, the outer end of the tubes are canted to increase the field from which direct rays from the sun will activate the photoelectric cells. Switching between control responsive to sun's rays and control by a computerized program is effected by a light level sensitive photoelectric cell. Further, the collector rotating and tilting drive mechanism is responsive to a stored computerized program that will effect return of the collector from a terminal position at sunset to an initial position for reactivation at sunrise of the following day.

6 Claims, 4 Drawing Figures

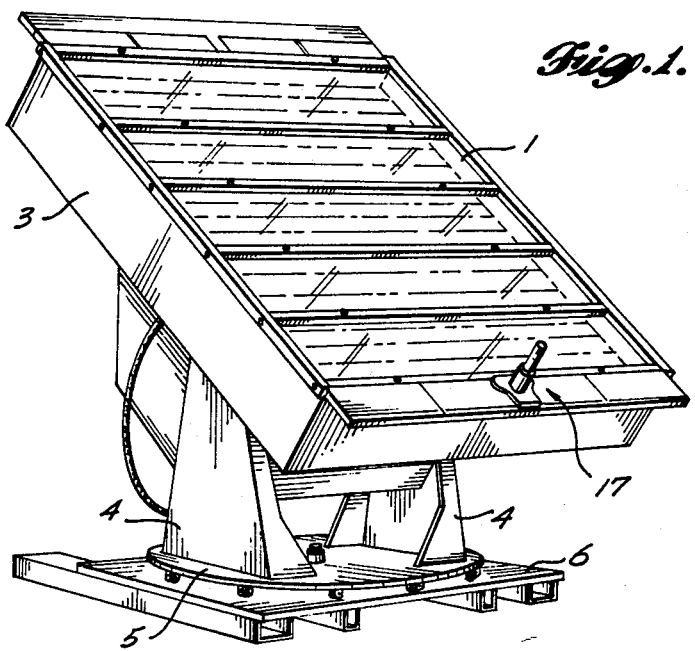
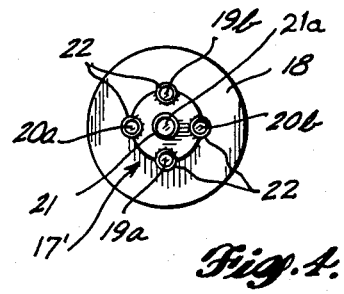
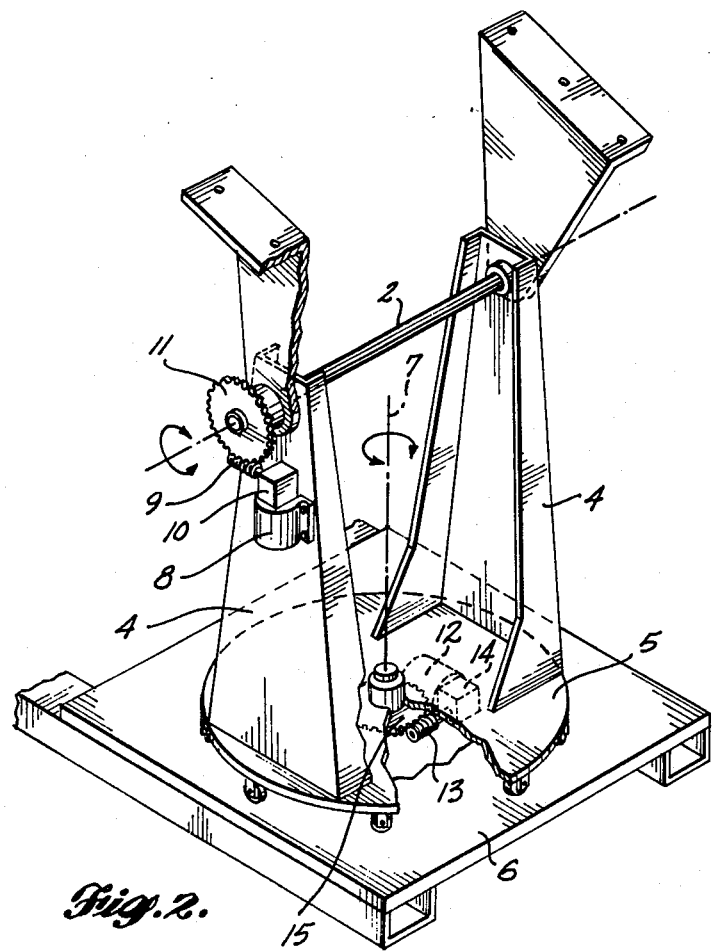
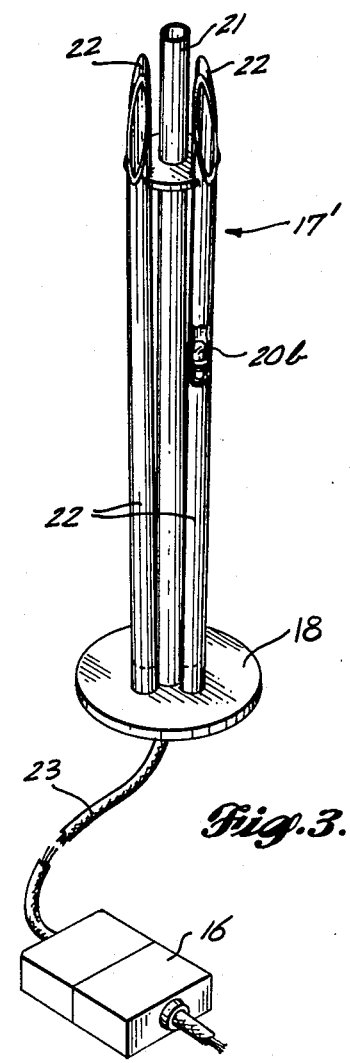

SOLAR ENERGY COLLECTOR SUN-TRACKING APPARATUS AND METHOD

BACKGROUND OF THE INVENTION

1. Field of the Invention

This invention relates to sun-tracking apparatus and methods for solar energy collectors, and more particularly to light sensitive control mechanism for controlling the drive of sun-tracking apparatus.

2. Problem

A problem of solar energy collectors is the decreased efficiency of such collectors which do not track the sun. Insolation received by a collector that tracks the sun during the summer is as much as three times as great as the insolation received by a stationary solar energy collector, and during the winter is as much as twice as great as the insolation received by a stationary collector. To solve the problem of maximizing insolation on a solar energy collector, therefore, it is necessary to mount the collector for movement to track the sun and to control movement of the tracking apparatus to track the sun reasonably precisely.

3. Prior Art

Prior solar energy collectors have usually been stationary, although the direction of some has been adjustable. It has been proposed to mount a solar energy collector for rotation about a vertical axis to adjust the azimuth and for tilting to adjust the altitude so as to point the collector toward the sun, especially during midday hours, but practical and economical drive and control mechanism for effecting the rotation of a base turntable and tilting of the collector relative to the base has not been available. Note the discussion of solar cooking at page 527 of volume 12 of the *McGraw-Hill Encyclopedia of Science and Technology*.

Sophisticated tracking mechanism for tracking the sun, planets or stars by automatically rotating a turntable about a vertical axis for azimuth adjustment and tilting a target about a horizontal axis for elevation adjustment is shown and described at pages 52 and 53 of volume 13 and at pages 737 and 738 of volume 1 of the *McGraw-Hill Encyclopedia of Science and Technology*.

Fully computerized control mechanism for trackers must be programmed differently for different latitudes of the earth's surface, as well as for different days during the year. Such programming is, therefore, very complex and expensive.

SUMMARY OF THE INVENTION

A principal object of the present invention is to provide control mechanism for a solar energy collector sun-tracking apparatus that will enable the collector to receive substantially maximum insolation throughout daylight hours at all times of the year.

A further object is to provide powered sun-tracking apparatus for a solar energy collector which is economical while being adequately accurate.

Another object is to provide sun-tracking apparatus for a solar energy collector which can be controlled with equal effectiveness whatever the geographical location of the collector installation may be.

It is also an object to provide reasonably precise light responsive sun-tracking apparatus which is much more economical than sun-tracking apparatus that is controlled entirely by a stored computerized program or by modulation of light received.

A further object is to control the aim of a solar energy collector reasonably accurately even when insolation is low.

An additional object is to reset the sun-tracking apparatus for a solar energy collector automatically at sunset of a day in the proper attitude for reactivation at sunrise of the following day.

The foregoing objects can be accomplished by providing sun-tracking apparatus carrying a solar energy collector that is turnable about at least one axis, and preferably is rotatable about a vertical axis and tiltable about a horizontal axis that is swung by such rotation about the vertical axis. Such rotation and tilting are effected under the control of at least one light sensitive cell responsive to sun's rays received at the location of the collector.

BRIEF DESCRIPTION OF THE DRAWINGS

FIG. 1 is a top perspective of a solar energy collector mounted on sun-tracking apparatus including a single photoelectric cell.

FIG. 2 is a top perspective of mounting mechanism for a solar energy collector with parts broken away.

FIG. 3 is a top perspective with parts broken away of a second light sensitive control mechanism for sun-tracking apparatus, and FIG. 4 is a top plan of such control mechanism.

DETAILED DESCRIPTION

Maximum insolation is received by a solar energy collector that is kept pointed at the sun throughout daylight hours so that the angle of incidence of the sun's rays is 0. The angle of incidence of a sun ray is the angle between the ray and the perpendicular to the plane of the collector energy-receiving surface at the point of incidence. For any location of the solar energy collector on the earth's surface, the direction of the sun's rays impinging on the collector target will not only vary progressively throughout the day, but also will vary from day to day throughout the year. Also, the direction of the sun's rays differs for different locations on the earth's surface.

Collection of solar energy by a stationary target is least efficient; collection of solar energy by a target adjusted around one axis is more efficient; and collection of solar energy is most efficient if the target can be moved to keep the target pointed substantially at the sun. Such pointing can be accomplished most readily by adjusting the azimuth of the collector about a vertical axis and adjusting the elevation of the collector about a horizontal axis for locations between a pole and the equator. Adjustments required to keep a target at the equator pointed at the sun are made almost entirely in elevation, and adjustments to keep a collector located at a pole pointed at the sun are made almost entirely in azimuth.

FIG. 1 shows a solar energy collector having a substantially planar target 1 that is mounted to be pointed toward the sun. Such mounting is shown in FIGS. 1 and 2 as including a horizontal shaft 2 carried by the collector case 3. Such shaft is journaled in the horns 4 of a yoke mounted on a turntable 5 rotatably supported on a base 6 to turn about a vertical axis 7.

The collector casing can be tilted about a horizontal axis relative to the horns of the mounting yoke by a motor 8 driving a worm 9 through a speed reducer 10. The worm, in turn, drives gear 11 carried by shaft 2 and rigidly connected to the collector case 3. The turntable 5 can be revolved about the vertical axis 7 by a motor 12 driving worm 13 through a speed reducer 14. Such worm turns gear 15 secured to the turntable.

A control mechanism is provided for energizing the motors 8 and 12 to adjust the attitude of the target 1. Motor 8 is reversible to turn gear 11 and shaft 2 for increasing the elevation of the casing progressively in the morning and decreasing the elevation of the casing progressively in the afternoon. Motor 12 is reversible for rotating turntable 5 to adjust the azimuth progressively in one direction during daylight and to adjust the azimuth in the opposite direction after sunset and before sunrise to reset the drive mechanism. While the extent of adjustment required will vary with the location on the earth's surface at which the collector is to be located, accurate pointing of the collector at the sun can be maintained at locations on the earth's surface where most of the population is located by providing for an elevational adjustment about the axis of the trunnions from 2 to 70 degrees and an azimuth adjustment about the vertical axis from 7 to 270 degrees.

In order to keep the target 1 pointing at the sun with reasonable accuracy, the motors 8 and 12 cannot be driven throughout the day at a preselected constant speed, even though the average apparent speed of the sun relative to the earth is 1 degree every four minutes. The total 360 degree revolution of the earth occurs in 24 hours or 1440 minutes. In temperate latitudes, the elevation of the collector casing 3 should be increased during the morning hours and the rate of increase should be progressively reduced toward noon, whereas in the afternoon the elevation should be decreased and the rate of such decrease should be progressively greater toward sunset. The azimuth adjustment effected by rotation of the turntable 5 around the axis 7 should be in the same direction throughout the day with the rate of change of azimuth increasing from sunrise to noon and decreasing from noon to sunset.

It is not necessary for the collector casing to be moved continuously in order to maintain the angle of incidence of the sun's rays sufficiently small to provide for very effective collection of solar energy by the target 1. Excellent insolation on the target can be accomplished by providing incremental adjustments of the elevation and azimuth at intervals of ½ minute to several minutes. Such adjustments can be timed, but preferably are triggered by an increase in the angle of incidence of sun's rays beyond a predetermined value. Moreover, an adjustment of either elevation or azimuth can be made from a lagging position to a true pointing position, or the requirement for continued adjustment can be anticipated by making each incremental adjustment from a lagging position through the true-pointing position to a substantially equal leading position. The elevation adjustment and the azimuth adjustment can be made in either of these ways or one can be adjusted in one fashion and the other can be adjusted in the other fashion.

The control mechanism 16 for the elevation motor 8 and the azimuth motor 12 normally is responsive to sun's rays at the target location. As shown in FIGS. 3 and 4, the modified sensing mechanism 17' constitutes a cluster of photoelectric cells. Such cluster is mounted on a base 18 carried by and moved with the collector casing 3 so that the pointing of the cell structure will be the same as the pointing of the solar energy collector 1.

The cluster of light responsive cells includes a lower elevation-controlling cell 19a and an upper elevation-controlling cell 19b located offset differently perpendicular to the horizontal axis; for example, such cells may be in a plane perpendicular to the horizontal axis and in a plane parallel to the plane of the collector. Such cells are spaced apart along the line of intersection of such planes. Azimuth-controlling cells 20a and 20b are offset laterally differently perpendicular to the vertical axis 7; for example, such cells may be in a plane perpendicular to the vertical axis and in a plane parallel to the plane of the collector. Such cells are spaced apart along the line of intersection of such planes, which line is always parallel to the horizontal axis. Preferably the four cells are arranged at opposite ends of two diameters of a circle in a plane parallel to the collector, the diameter in which the elevation-controlling cells are located being in a plane perpendicular to the horizontal axis, and the diameter in which the azimuth-controlling cells are located being perpendicular to such first diameter. At the center of the cluster is a photoelectric cell 21a responsive to light intensity.

Each of cells 19a, 19b, 20a and 20b, and 21a is buried in a shield tube 22 and 21, respectively, enabling the cell to be exposed to direct rays of the sun but shielding the cell from dispersed or stray light which might cause one or more of the cells to activate the control mechanism 16 other than entirely in response to light of sun's rays. The upper end of each shield tube for photoelectric cells 19a, 19b, 20a and 20b can be canted radially outward of the cluster if desired. Such canting of the tube end will enable sun's rays to be received by at least one of the peripheral photoelectric cells even if the angle of incidence is great, such as 40 degrees.

Suitable photoelectric cells for sensing sun's rays are Clearex CL605L, for example. The cells are connected to the control mechanism 16 by a multiple conductor cable 23. The control mechanism will convert energization of the various cells into appropriate signals for energizing one or both of motors 8 and 12 to rotate in the appropriate direction to reduce an excessive angle of incidence. Time delay components may be included in the control mechanism 16 to avoid the possibility of a pointing control operation being effected if one or more of the cells 19a, 19b, 20a and 20b is energized briefly by stray light.

It is preferred that the shield tubes 22 diverge outward slightly from the cell-supporting base 18 so that the cells 19a and 19b cannot be activated simultaneously by sun's rays, nor can the cells 20a and 20b be activated simultaneously by sun's rays. Thus, if cell 19a is activated, the control mechanism 16 will energize motor 8 to decrease the elevation of the target 1, and, consequently, of the cell cluster 17', until cell 19a is deactivated. If photoelectric cell 19b is activated the control mechanism 16 will energize motor 8 to tilt the target 1 and cell cluster 17' to increase the elevation until cell 19b is deactivated.

Similarly, if cell 20a is activated by sun's rays, the control mechanism 16 will energize motor 12 to rotate turntable 15 clockwise until cell 20a is deactivated. Alternatively, if photoelectric cell 20b is activated by sun's rays, control mechanism 16 will energize motor 12 to rotate in the opposite direction for turning turntable 5 counterclockwise until cell 20b is deactivated. With such rotation of the turntable 5, the azimuth can be adjusted either east or west as may be required to point the target and cell cluster at the sun. Thus the sun's rays will activate one of the cells to effect control of the power drive to turn the target about an axis from which such cell is offset in the direction to tilt the target toward the sun until such cell is obscured from the sun's rays by the shield tube in which the cell is housed.

If the intensity of the sun's rays should be reduced sufficiently so that the cells 19a, 19b, 20a and 20b cannot be activated to cause the control mechanism 16 to effect appropriate pointing movement of the solar energy-receiving target 1, the photoelectric cell 21a will effect operation of the control mechanism 16 to substitute programmed incremental energization of motor 8 and-/or motor 12 to effect approximate alteration of elevation and/or azimuth of the solar energy collector mount. Such approximate incremental movement of the mounting mechanism may, for example, provide an azimuth adjustment of 1 degree every four minutes. Precise pointing of the collector toward the sun is not as important under cloud cover conditions because the amount of insolation received by the target is relatively small under a cloud cover anyway. When the intensity of the sun's rays again increases sufficiently, the center cell 21a will effect operation of the control mechanism 16 to discontinue reliance on the programmed control and again to be governed by activation of the photoelectric cells 19a, 19b, 20a and 20b.

As discussed above, solar collectors located near the equator or at extreme latitudes may operate quite efficiently if adjusted around only one axis; adjustments required to keep a target at the equator pointed substantially at the sun may be made in elevation only by tilting the target about a north-south axis, and adjustments to keep a target located in extreme latitude substantially pointed at the sun may be made in azimuth only by tilting the target about an axis perpendicular to the earth's surface.

If the collector shown in FIG. 1 is located at the equator with the axis of the horizontal shaft 2 extending north-south, perpendicular to the equator, the single photoelectric cell 17 is in a position tilted slightly toward the west from vertical when the target is in the horizontal position. The single photoelectric cell 17 is activated by the sun's rays when the sun has passed through the zenith in which the angle of incidence of the sun's rays impinging on the collector target is perpendicular. Activation of the photoelectric cell effects energization of drive mechanism to cause the target to be repositioned about the elevation axis until it is pointing substantially at the sun and the photoelectric cell and its shield tube are tilted correspondingly. In this position the photoelectric cell has been moved out of a position receiving rays from the sun, in the same manner as discussed above with respect to photoelectric cell 19b.

If the collector is located in the extreme latitudes, the single photoelectric cell 17 is tilted slightly to the west relative to a line perpendicular to the target when the target is pointed directly toward the equator. The target, the photoelectric cell and its shield tube are repositioned incrementally about the upright azimuth axis toward the west in response to activation of the single photoelectric cell by the sun's rays as the sun sweeps from east to west in the equatorial region as discussed above with reference to photoelectric cell 20a or 20b.

The control of light intensity cell 21a over control mechanism 16 to substitute a programmed control for direct control by cells 19a, 19b, 20a and 20b occurs not only in the event of a cloud cover but also after sunset. Under such conditions, the light intensity cell 21a can initiate a resetting energization of motors 8 and 12 to shift the apparatus from one extreme of azimuth to the opposite extreme. It will not be necessary to adjust the elevation appreciably, if any. Such resetting should require the joint control of suitable timing mechanism in conjunction with a low light intensity response of cell 21a. Alternatively, the resetting operation could be triggered simply by timing mechanism set for sunset or by a limit switch closed when the turntable 5 had rotated through a maximum azimuth adjustment to the west.

In addition to the light responsive control of the control mechanism 16 by the photoelectric cells 19a, 19b, 20a and 20b, the low light intensity control of the cell 21a and timing controls, it is preferred that manual controls be incorporated in the control mechanism 16 so that motor 8 can be energized to tilt the collector casing 3 in either direction and/or motor 12 can be energized to rotate the turntable 5 in either direction at will. Thus, the operation of the mechanism will always be subject to the overriding control of an operator.

I claim:

1. In a sensing mechanism including a photoelectric cell for sun-tracking apparatus having an insolation receiver to be directed toward the sun and an elongated shield tube housing the photoelectric cell for exposing the cell to the rays of the sun while shielding the cell from stray light, the improvement comprising canting the end of the shield tube to enable the rays of the sun to expose the cell when the angle between the direction of the sun's rays and the longitudinal axis of the shield tube is toward the lower side of the cant from the tube's longitudinal axis.

2. In the sensing mechanism defined in claim 1, the cant enabling the cell to be exposed to the rays of the sun when the angle between the direction of the sun's rays and the longitudinal axis is as great as 40°.

3. In the sensing mechanism defined in claim 1 or 2, means mounting two shield tubes with their longitudinal axes in divergent upward relationship and the cant of each tube at the side remote from the other tube.

4. Sensing mechanism for sun-tracking apparatus having an insolation receiver directed toward the sun comprising a base, a cluster of at least three elongated upstanding shield tubes mounted on said base, and photoelectric cells positioned within said shield tubes for exposing the cells to rays of the sun but shielding the cells from stray light, the longitudinal axes of said shield tubes diverging from each other in the direction away from said base and the end of each shield tube remote from said base being canted at its side remote from the center of the cluster.

5. The sensing mechanism defined in claim 4, including four diverging canted shield tubes and four photoelectric cells positioned within the shield tubes, the end of each shield tube remote from the base being canted at its side remote from the center of the cluster.

6. Control mechanism for sun-tracking apparatus having an insolation receiver directed toward the sun comprising power means for directing the insolation receiver, first sensing means for sensing the location of the sun and normally operable to control said power means, second sensing means for sensing the intensity of the sun's rays, means for overriding control of said power means by said first sensing means if such intensity sensed by said second sensing means falls below a predetermined value, and programmed means for effecting incremental movement of said power means when the intensity of the sun's rays falls below such predetermined value.

* * * * *